US007797273B2

(12) United States Patent
Levi et al.

(10) Patent No.: US 7,797,273 B2
(45) Date of Patent: Sep. 14, 2010

(54) SYSTEM AND A METHOD FOR RELIABLE SYMMETRIC DATA SYNCHRONIZATION

(75) Inventors: Moshe Levi, Petach Tikva (IL); Moshe Dgani, Holon (IL)

(73) Assignee: Emoze Ltd., Ra' Anana (IL)

( * ) Notice: Subject to any disclaimer, the term of this patent is extended or adjusted under 35 U.S.C. 154(b) by 68 days.

(21) Appl. No.: 11/389,754

(22) Filed: Mar. 27, 2006

(65) Prior Publication Data

US 2007/0226271 A1 Sep. 27, 2007

(51) Int. Cl.
*G06F 17/30* (2006.01)

(52) U.S. Cl. ....................................... 707/609; 707/611

(58) Field of Classification Search ................. 707/200, 707/201, 609, 611
See application file for complete search history.

(56) References Cited

U.S. PATENT DOCUMENTS 5,623,666 A * 4/1997 Pike et al. ................... 707/200
5,978,791 A * 11/1999 Farber et al. ................... 707/2
6,115,710 A * 9/2000 White ......................... 707/10
6,678,700 B1 * 1/2004 Moore et al. ................ 707/200
6,721,747 B2 * 4/2004 Lipkin ......................... 707/10
6,745,209 B2 * 6/2004 Holenstein et al. .......... 707/203
6,925,477 B1 * 8/2005 Champagne et al. ........ 707/203
6,928,442 B2 * 8/2005 Farber et al. .................. 707/10
2002/0133507 A1 * 9/2002 Holenstein et al. .......... 707/200
2004/0243644 A1 * 12/2004 Steere et al. ................ 707/200
2005/0021567 A1 * 1/2005 Holenstein et al. .......... 707/200
2005/0065984 A1 * 3/2005 Yagisawa et al. ............ 707/200
2005/0120059 A1 * 6/2005 Verma et al. ................ 707/200
2006/0041596 A1 * 2/2006 Stirbu et al. ................. 707/200
2007/0006231 A1 * 1/2007 Wang et al. ................. 718/100
2007/0023507 A1 * 2/2007 Starbuck et al. ............. 235/382
2007/0171903 A1 * 7/2007 Zeng et al. .................. 370/389

* cited by examiner

*Primary Examiner*—Don Wong
*Assistant Examiner*—Kim T Nguyen
(74) *Attorney, Agent, or Firm*—Hogan Lovells US LLP

(57) ABSTRACT

A system for synchronizing data between at least two electronic devices. The system includes at least one sending (source) side electronic device having a database and at least one receiving (target) side electronic device having a database, such that each data item has unique local and remote identifiers, wherein the local identifier of one side is the remote identifier of the other side and vice versa, thereby providing reliable, efficient and symmetrical synchronicity between the at least two electronic devices.

27 Claims, 8 Drawing Sheets

SYSTEM AND A METHOD FOR RELIABLE SYMMETRIC DATA SYNCHRONIZATION

FIELD OF THE INVENTION

The present invention relates generally to sending data from one electronic device to another, and more particularly to a system and a method for reliable symmetric data synchronization between electronic devices.

BACKGROUND OF THE INVENTION

With the proliferation of home computers, office computers, 3G mobile phones, personal digital assistants (PDA's), car computers, etc., it becomes increasingly important for all of these devices to be "on the same page." Companies such as BlackBerry and Intellisync provide data synchronization, but fall short of using methods that are efficient and reliable.

It would therefore be advantageous to provide a system and a method that uniquely identifies data for reliable symmetric data synchronization.

SUMMARY OF THE INVENTION

Accordingly, it is a principal object of the present invention to provide a system and a method that uniquely identifies data for reliable symmetric data synchronization.

It is another principal object of the present invention to provide a system that synchronizes any data between computers, PDA's, smart phones, etc.

It is a further principal object of the present invention to uniquely identify data in the scope of a single computer and encapsulate it into a memory buffer of finite length.

It is one other object of the present invention to support an items hierarchy and ensure that parent-child relationships are also synchronized.

It is yet a further object of the present invention to provide a sharing mechanism, which when applied to parents may switch on and off synchronization of all branches under the parent.

It is still a further object of the present invention to provide a restrictions mechanism that excludes certain items from synchronization, depending on item properties.

It is yet one more object of the present invention to provide target synchronization operations, including "add," "delete" and "update," as well as non-synchronization operations, such as queries.

It is still one more object of the present invention to resolve "update" conflicts using priority levels which are assigned to each electronic device that participates in the synchronization.

It is yet another object of the present invention to allow partial updates of items that were synchronized beforehand.

It is still another object of the present invention to provide synchronization that is network-layer independent and can be performed using other reliable and even unreliable protocols.

It is yet still another object of the present invention to design for open architecture and cross platform operation.

It is yet still one other object of the present invention to provide data encryption, compression and other transforms.

It is yet still one further object of the present invention to provide data representation and encapsulation that is proprietary.

It is yet still one more object of the present invention to provide a system that has no synchronization sessions, yet is reliable, and thus can withstand network errors, data loss, sudden aborts, etc., due to the symmetric nature of the synchronization provided.

It is yet still a further object of the present invention to provide a system wherein when any new/changed item is marked as synchronized, it is guaranteed to be synchronized.

A system is disclosed for synchronizing data between at least two electronic devices. The system includes at least one sending (source) side electronic device having a database and at least one receiving (target) side electronic device having a database, such that each data item has unique local and remote identifiers, wherein the local identifier of one side is the remote identifier of the other side and vice versa, thereby providing reliable, efficient and symmetrical synchronicity between the at least two electronic devices.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

For a better understanding of the invention with regard to the embodiments thereof, reference is made to the accompanying drawings, in which like numerals designate corresponding items or sections throughout, and in which.

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
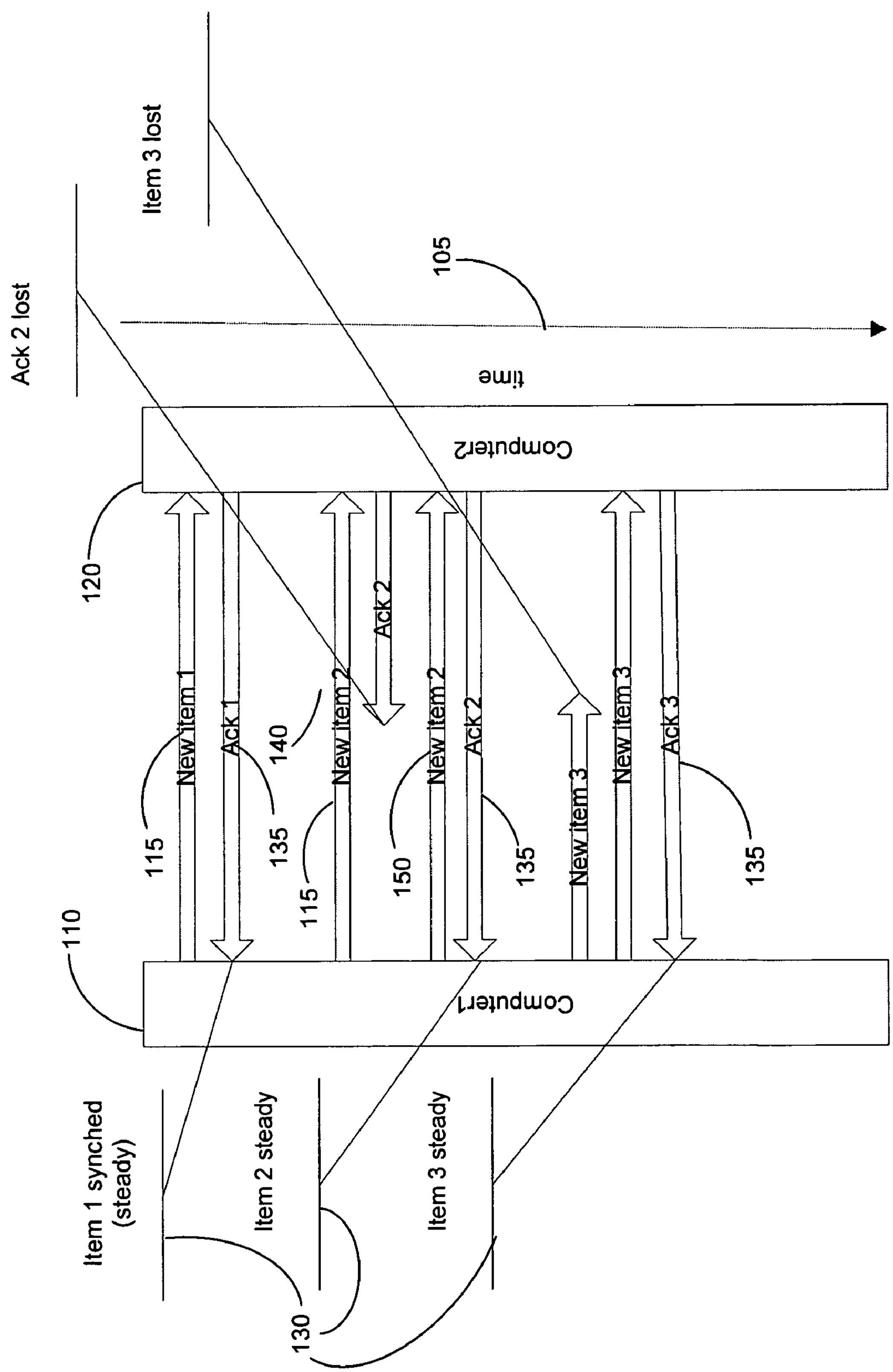
FIG. 1 is a schematic sequence of operation for adding a new item in one electronic device, constructed in accordance with the principles of the present invention.

FIG. 1 is a schematic representation of a sequence of operation over time 105 for adding a new item 115 or changing an item in one electronic device 110, constructed in accordance with the principles of the present invention. The mechanism is based on commands and Acknowledges, so that a new/changed item becomes synchronized 130 only if Acknowledge 135 from the other electronic device 120 is received. If Acknowledge is not received 140, the item will be resent 150.

Figure 2:
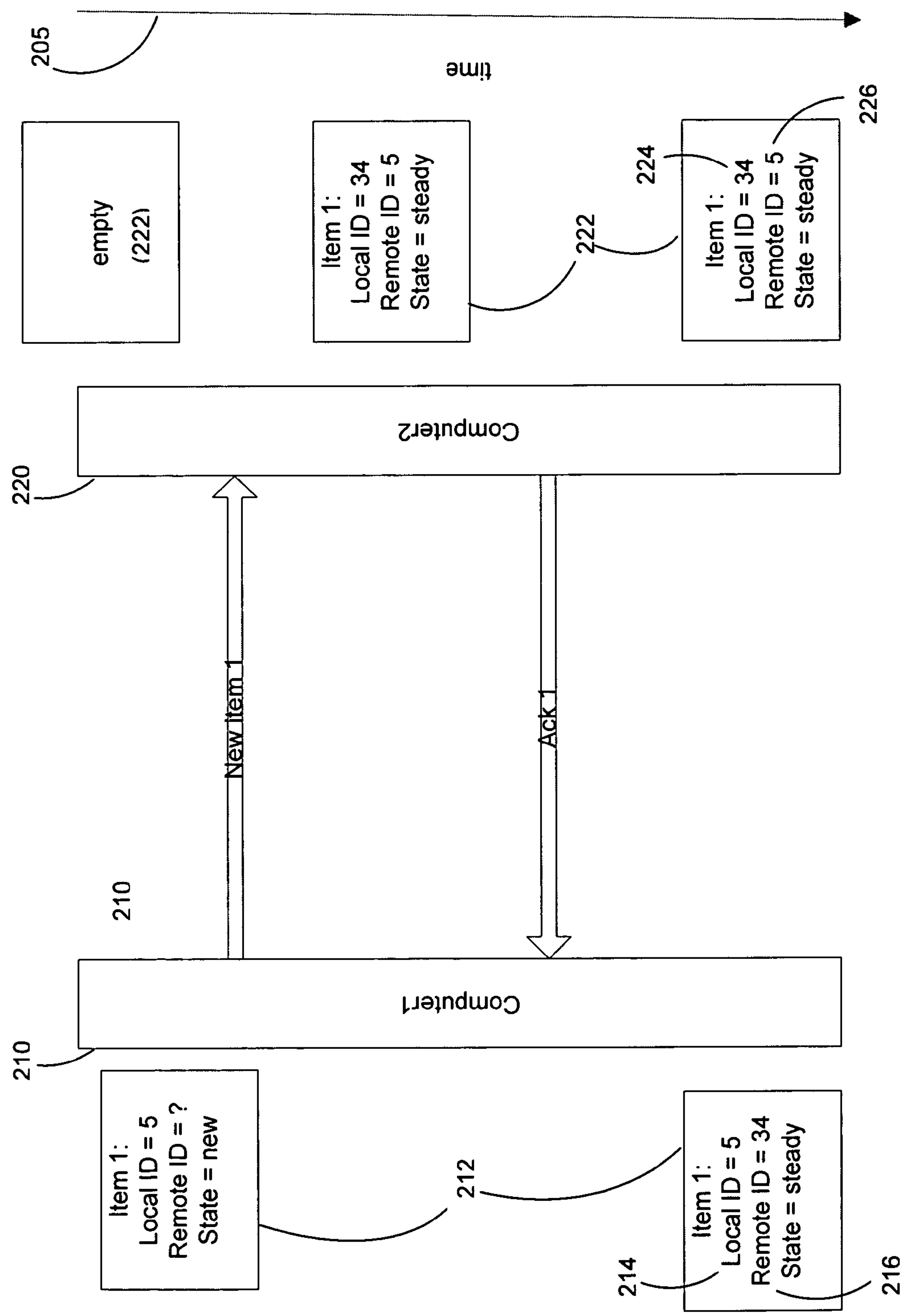
FIG. 2 is a schematic sequence of operation of the symmetrical nature of the databases required by both sides, constructed in accordance with the principles of the present invention.

FIG. 2 is a schematic representation of a sequence of operation over time 205 of the symmetrical nature of the databases required by both sides, constructed in accordance with the principles of the present invention. An exemplary sending (source) side electronic device 210 has a database 212, as well as local identifiers 214 and remote identifiers 216. An exemplary receiving (target) side electronic device 220 has a database 222, as well as local identifiers 224 and remote identifiers 226. Identifiers are applied to all items that were or should be synchronized, and the databases and operations of both sides are symmetrical. Each item has local and remote identifiers, which should be unique on local and remote electronic device respectively. Local ID of one side 214, for example, is remote ID 226 of the other side.

Figure 3:
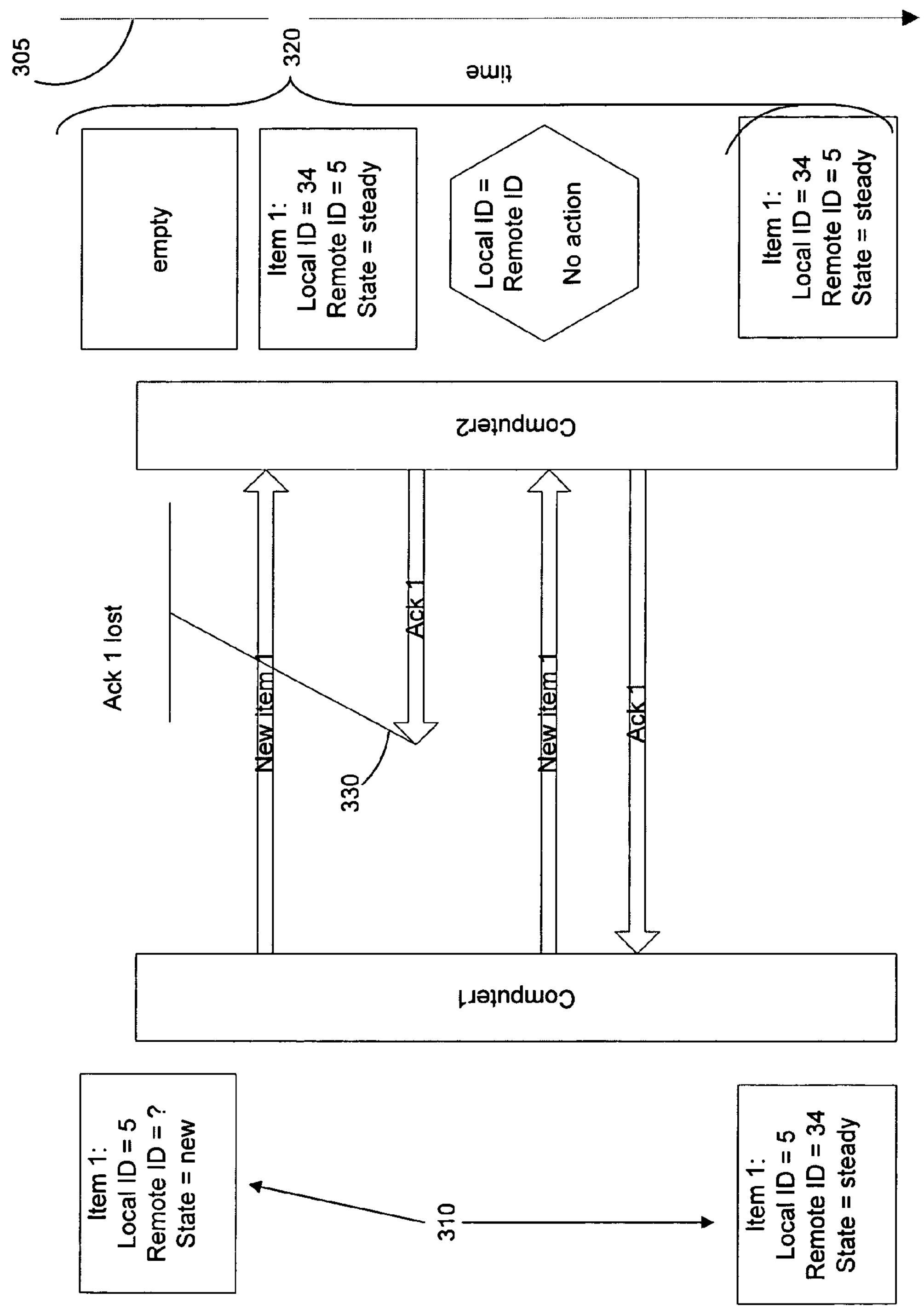
FIG. 3 is a schematic sequence of operation of how the symmetrical databases exclude duplications in the event that data is lost, constructed in accordance with the principles of the present invention.

FIG. 3 is a schematic representation of a sequence of operation over time 305 illustrating how the symmetrical databases 310, 320 exclude duplications in the event that data is lost, constructed in accordance with the principles of the present invention. The system's symmetrical databases 310, 320 are shown excluding duplications in case that part of the data exchange was lost 330.

Figure 4:
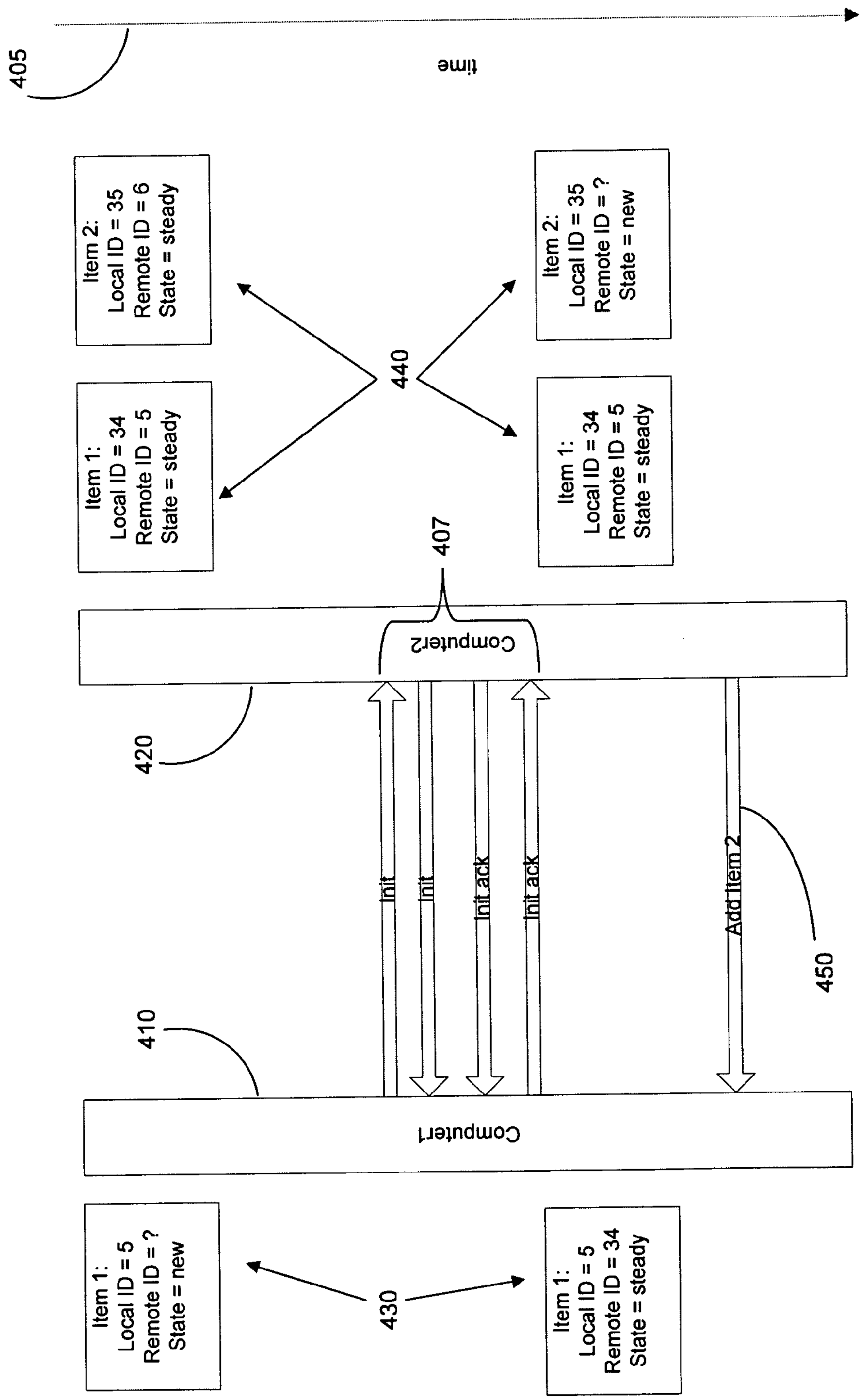
FIG. 4 is a schematic sequence of operation of the initialization process required before synchronization can start, constructed in accordance with the principles of the present invention.

FIG. 4 is a schematic representation of a sequence of operation over time 405 of the initialization process required before synchronization can start, constructed in accordance with the principles of the present invention. An initialization process 407 is required as part of the workflow. The couple of exemplary computers 410, 420 cannot start synchronization if their databases 430, 440 are not synchronized. Therefore, before synchronization can start 450 the system should be provided with the list of existing items. The list should include ID's and states. FIG. 4 illustrates an exchange of initializing messages with update statuses of existing items 407. The order of init messages is not important.

Figure 5:
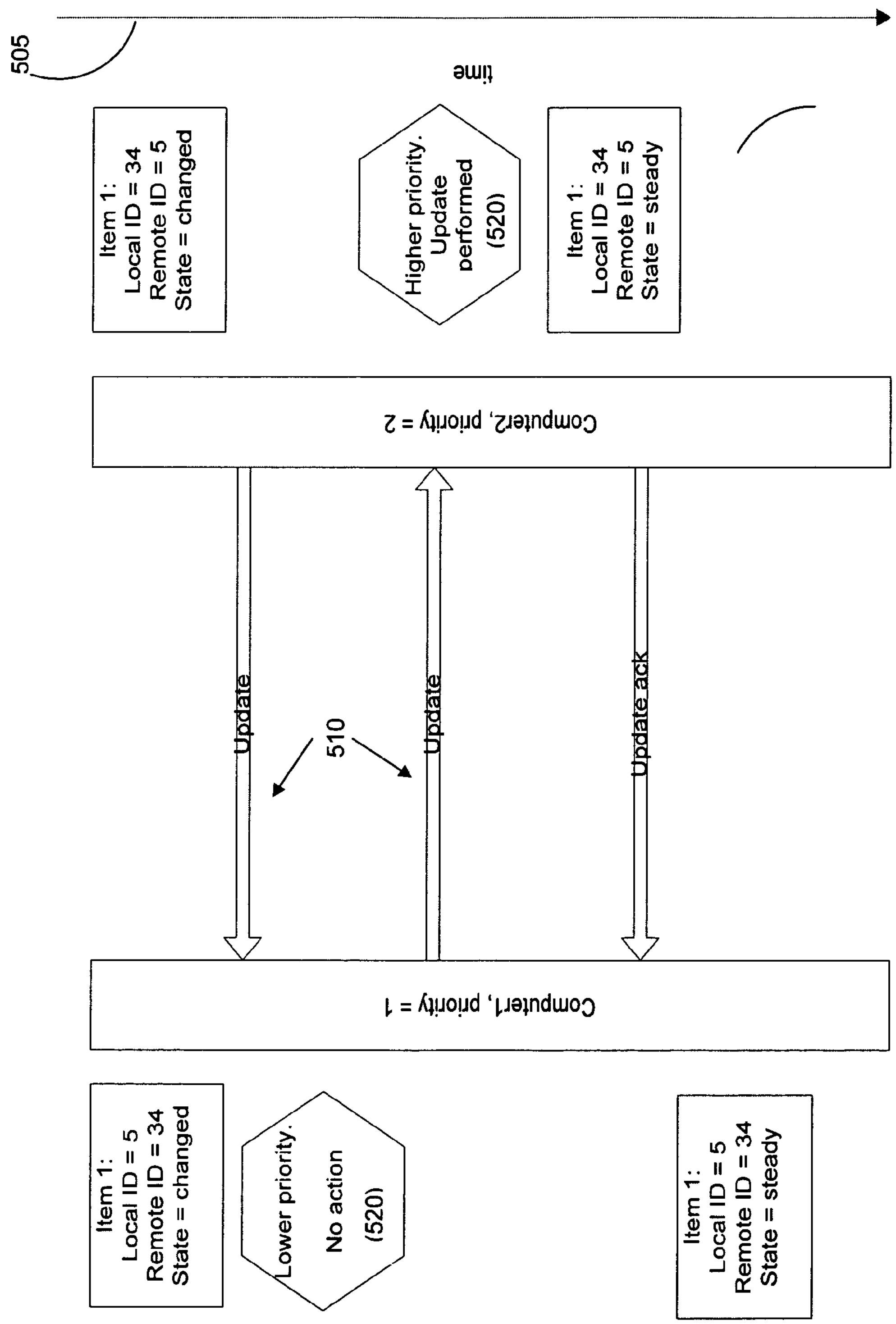
FIG. 5 is a schematic sequence of operation of how conflict resolution is based on priority, constructed in accordance with the principles of the present invention.

FIG. 5 is a schematic representation of a sequence of operation over time 505 of how conflict resolution is based on priority, constructed in accordance with the principles of the present invention. When handling Updates the system considers 2 special aspects:

There are possible conflicts 510; and

One electronic device may have several updates in a row.

Conflict resolution is based on priority 520. However, partial (field-by-field) updates are possible. For simplicity a conflict resolution for the whole item is shown in FIG. 5.

Figure 6:
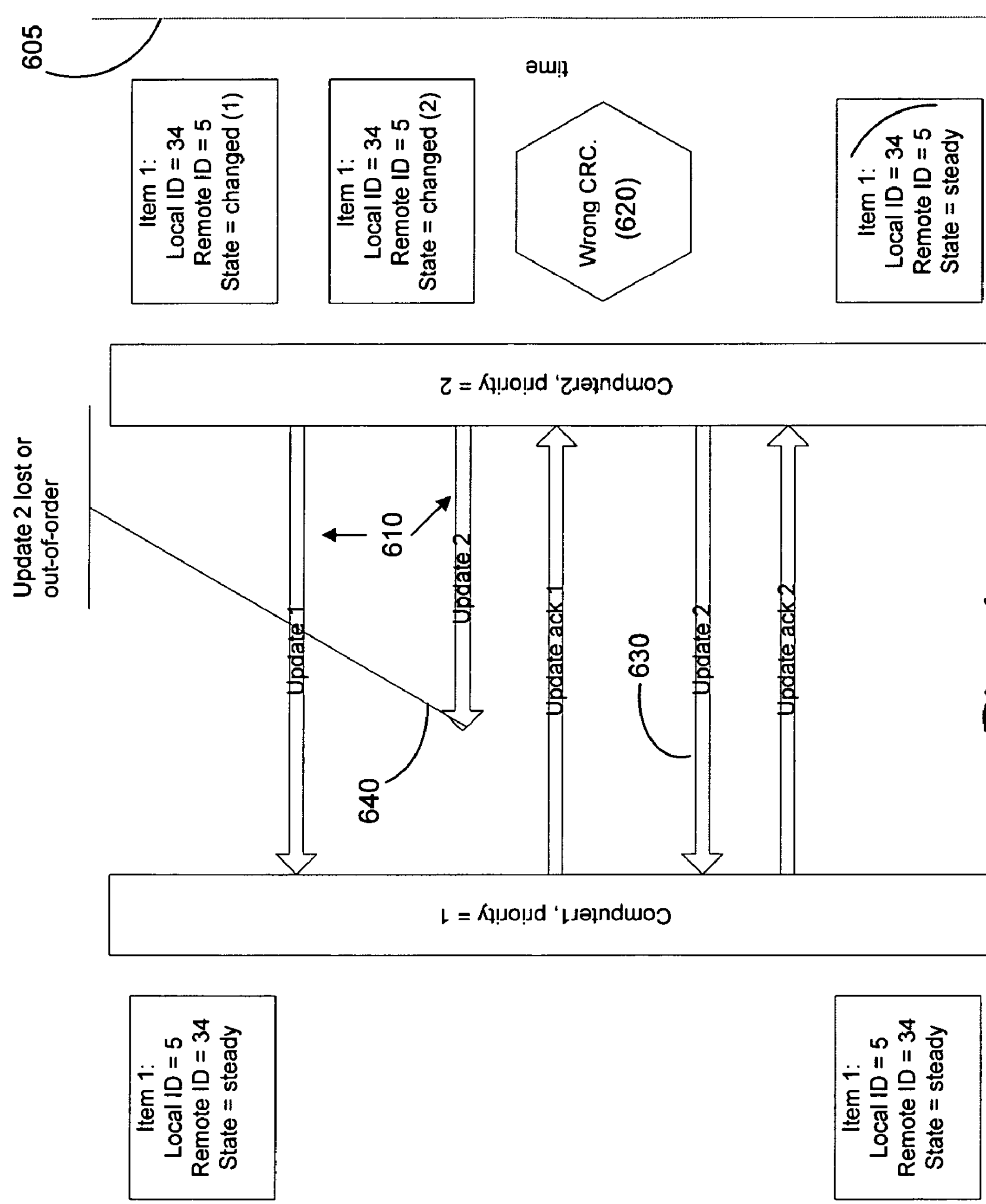
FIG. 6 is a schematic sequence of operation of the use of cookies to identify an update, constructed in accordance with the principles of the present invention.

FIG. 6 is a schematic representation of a sequence of operation over time 605 of the use of cookies to identify an update, constructed in accordance with the principles of the present invention. To solve the problem of more than one update in the row from the same side 610, each update Acknowledge has a cookie that identifies an update. Item cyclic redundancy check (CRC) 620 is an example of such a cookie. If update Acknowledge bears a wrong cookie, update is sent again 630. Hence reliability is provided for lost update messages 640, update message recording, reordering, etc.

Figure 7:
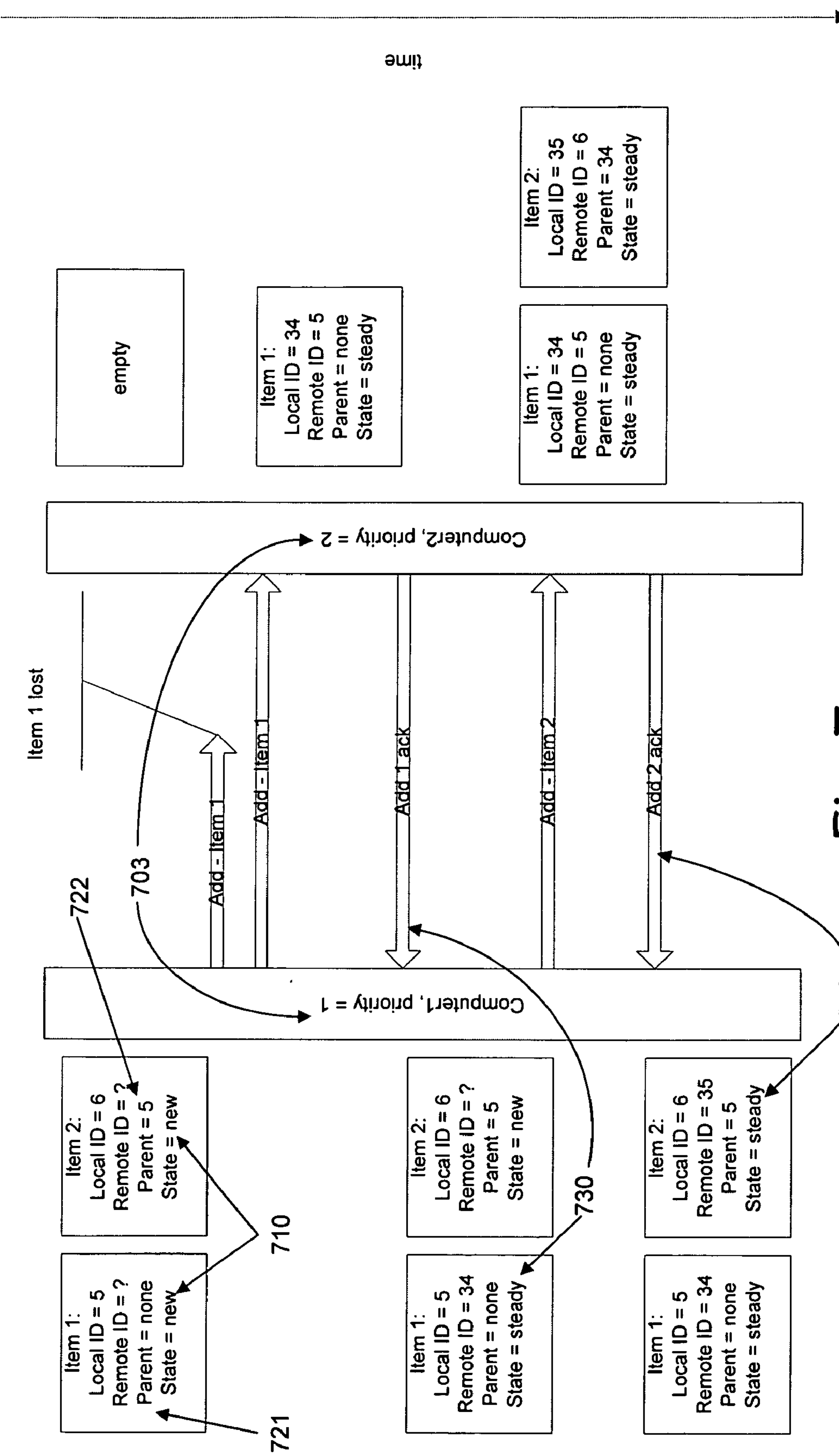
FIG. 7 is a schematic sequence of operation illustrating the use of a parent attribute to provide hierarchical relationships, constructed in accordance with the principles of the present invention.

FIG. 7 is a schematic representation of a sequence of operation illustrating the use of a parent attribute to provide hierarchical relationships, constructed in accordance with the principles of the present invention. The hierarchy is provided by the parent attribute of each item. Computer1, with a higher priority 703 than computer2, has two items which have not been synchronized 710, item 1 with a local ID of 5 and no parent 721 and item 2 with a local ID of 6 and for which item 1 is the parent 721. The system ensures that the parents are synchronized before the children. Thus, item 1 is synchronized first 730 and then item 2 740.

Figure 8:
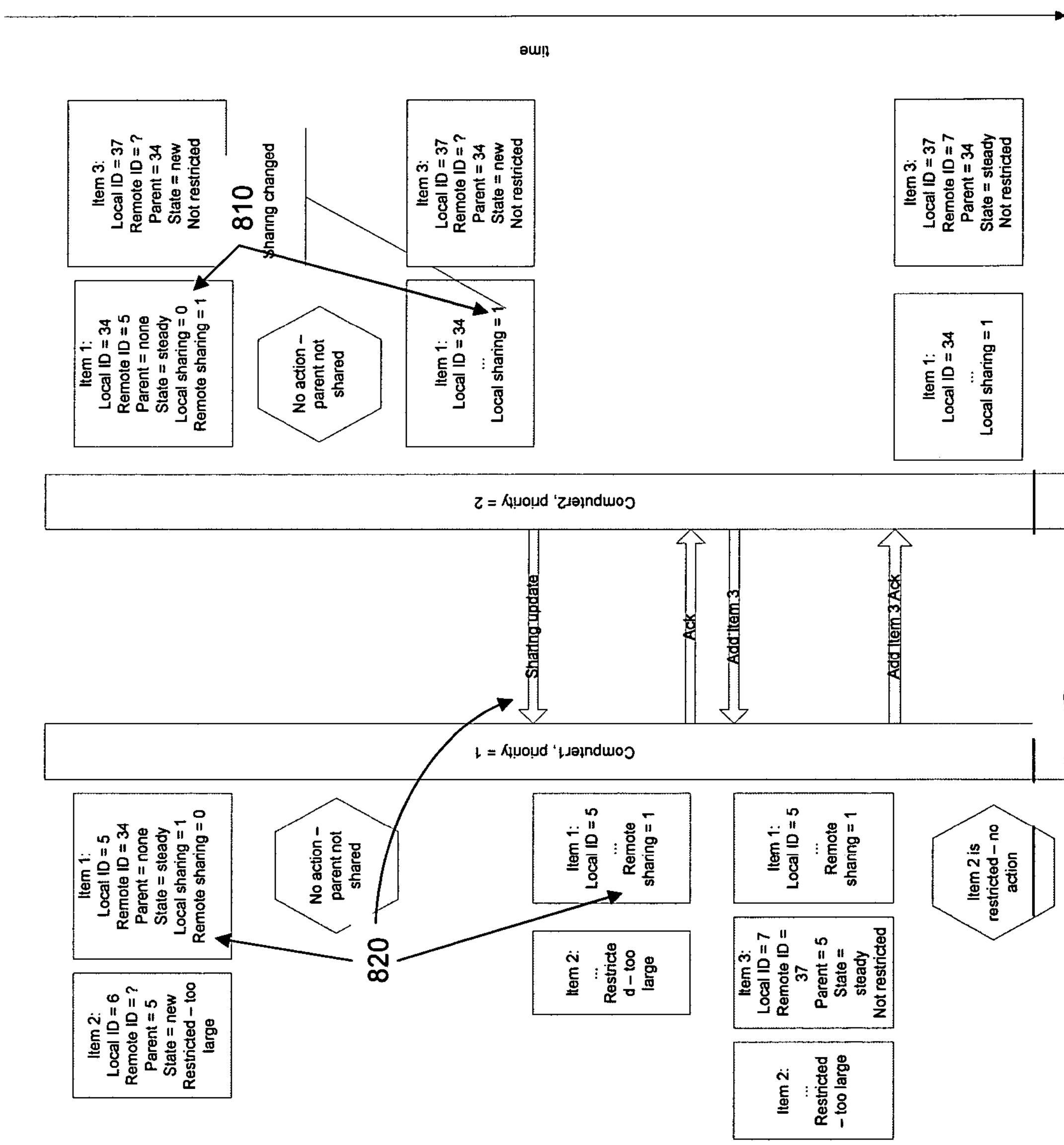
FIG. 8 is a schematic sequence of operation illustrating the sharing of parents as being symmetrical, constructed in accordance with the principles of the present invention.

FIG. 8 is a schematic sequence of operation illustrating the sharing of parents as being symmetrical, constructed in accordance with the principles of the present invention. Sharing of the parents is also symmetrical and has both local and remote attributes. Thus, when sharing is changed 810 for exemplary computer2, this must be updated to exemplary computer1 820. Item is shared only if both of its sharing attributes are enabled. The restrictions are set on each side independently:

It is to be understood that the phraseology and terminology employed herein are for the purpose of description, and should not be regarded as limiting.

It is important, therefore, that the scope of the invention is not construed as being limited by the illustrative embodiments set forth herein. Other variations are possible within the scope of the present invention as defined in the appended claims and their equivalents.

We claim:

1. A system for synchronizing data between at least two electronic devices, said system comprising:

at least one receiving (target) side electronic device having a database being compatible to a database of an at least one sending (source) side electronic device, such that each data item has unique local and remote identifiers, wherein the local identifier of one side is stored as the remote identifier of the other side and vice versa, wherein access to the data item stored in the database of the at least one receiving (target) side electronic device, when synchronizing entire data items in the database of the at least one receiving (target) side electronic device to the database of the at least one sending (source) side electronic device, is enabled by receiving an element from a group consisting of the remote identifier and the local identifier of the data item as stored in the database of the at least one sending (source) side electronic device and verifies that the data fields contained in the data item as stored in the database of the at least one sending (source) side electronic device match the data fields contained in the data item as stored in the database of the at least one receiving (target) side electronic device, and wherein the data item stored in the database of the at least one receiving (target) side electronic device is selected from a list consisting of two or more object types, each of the two or more object types comprising different data fields, wherein the synchronizing is performed after comparing the object type of the data item as stored in the database of the at least sending (source) side electronic device with the data item as stored in the database of the at least one receiving (target) side electronic device.

2. The system of claim 1, wherein the local identifier and the remote identifier of the data item are unique identifiers for each data item stored in the database of the at least one sending (source) side electronic device.

3. The system of claim 1, wherein the electronic device is a smart phone.

4. The system of claim 1, wherein the electronic device excludes duplications of data items in the database of the at least one receiving (target) side electronic device in case part of the data was lost in the data exchange.

5. The system of claim 1, wherein the electronic device is a computer.

6. The system of claim 1, wherein said each data item is uniquely identified in the scope of one of said at least two electronic devices and is encapsulated into a finite length memory buffer of each of said databases.

7. The system of claim 1, wherein said system supports a priority hierarchy of said items, and wherein said hierarchy is provided by a parent attribute of each of said data items and ensures that parent-child relationships are also synchronized.

8. The system of claim 7, wherein said system provides a sharing mechanism, which when applied to said parents may switch on and off synchronization of all branches under the parent.

9. The system of claim 1, wherein said system provides a restrictions mechanism that excludes certain items from synchronization, depending on item properties.

10. The system of claim 7, wherein said system provides target synchronization operations, comprising at least "add," "delete" and "update."

11. The system of claim 1, wherein said system provides non-synchronization operations.

12. The system of claim 1, wherein said non-synchronization operations comprise at least queries.

13. The system of claim 10, wherein said system resolves "update" conflicts using priority levels, wherein said priority levels are assigned to each of said at least two electronic devices that participate in said synchronization.

14. The system of claim 1, wherein said system allows partial updates of items that were synchronized beforehand.

15. The system of claim 1, wherein said synchronization is network-layer independent and can be performed using other reliable and even unreliable protocols.

16. The system of claim 1, wherein said system is designed for cross platform operation.

17. The system of claim 1, wherein said system provides transforms comprising at least data encryption and compression.

18. The system of claim 1, wherein said system provides data representation and encapsulation that is proprietary.

19. The system of claim 1, wherein synchronization sessions are performed symmetrically from the source to the target and from the target to the source.

20. The system of claim 1, wherein when any "add" item is marked as synchronized, it is guaranteed to be synchronized.

21. The system of claim 1, wherein when any "update" item is marked as synchronized, it is guaranteed to be synchronized.

22. A method for synchronizing data between at least one sending (source) side electronic device having a database and at least one receiving (target) side electronic device having a database, the method comprising:

receiving a data item at the at least one receiving (target) side electronic device from the at least one sending (source) side electronic device;

assigning an identifier value to the data item stored in both databases, such that the local identifier of the data item stored in the database of the at least one sending (source) side electronic device is identical to a remote identifier of the same data item stored in the database of the at least one receiving (target) side electronic device;

verifying that the data fields contained in the data item as stored in the database of the at least one sending (source) side electronic device match the data fields contained in the data item as stored in the database of the at least one receiving (target) side electronic device;

enabling synchronization of the data item in the database of the at least one receiving (target) side electronic device upon receipt of the remote identifier or the local identifier of the data item from the at least one sending (source) side electronic device.

23. The system of claim 1 wherein the local identifier and the remote identifier are numerical identifiers.

24. The system of claim 1 wherein the local identifier and the remote identifier are integer identifiers.

25. The method of claim 22, further comprising a step of selecting items to be synchronized, according to the remote identifier or the local identifier values received from the at least one sending (source) side electronic device.

26. The method of claim 22, further comprising a step of adding a new type of data records in case the data fields contained in the data item as stored in the database of the at least one sending (source) side electronic device do not match the data fields contained in the data item as stored in the database of the at least one receiving (target) side electronic device.

27. The method of claim 22, further comprising a step of excluding duplications of data items in the database of the at least one receiving (target) side electronic device in case part of the data was lost in the data exchange.

* * * * *